United States Patent

[11] 3,612,160

| [72] | Inventor | William W. Burroughs, Jr.<br>Manchester, Mass. |
|---|---|---|
| [21] | Appl. No. | 752,907 |
| [22] | Filed | Aug. 15, 1968 |
| [45] | Patented | Oct. 12, 1971 |
| [73] | Assignee | General Motors Corporation<br>Detroit, Mich. |

[54] INERTIAL REFERENCE APPARATUS
6 Claims, 5 Drawing Figs.

[52] U.S. Cl. .................................................... 74/5.34, 165/47
[51] Int. Cl. .................................................... G01c 19/08
[50] Field of Search .................................... 74/5.34; 244/79; 248/183; 73/504; 165/181, 47

[56] References Cited
UNITED STATES PATENTS

| 2,954,700 | 10/1960 | Deschamps | 74/5.34 |
| 2,958,522 | 11/1960 | Slater | 73/504 |
| 2,999,390 | 9/1961 | Bosch et al. | 74/5.34 |
| 3,320,819 | 5/1967 | Riordan et al. | 74/5.34 |
| 3,481,208 | 12/1969 | Thrasher et al. | 74/5.34 |

OTHER REFERENCES

" Aviation Week and Space Technology," Feb. 20, 1967, pages 68–71 and 75.

*Primary Examiner*—Manuel A. Antonakas
*Attorneys*—William S. Pettigrew, Creighton R. Meland and Albert F. Duke

ABSTRACT: An inertial reference unit for navigation and control systems comprising gimballed platforms carrying inertial measurement instruments. Upper and lower platforms are disposed in stacked relation within a cylindrical inner roll gimbal. The upper platform, which is rotatable relative to the gimbal is stabilized in azimuth by a closed-loop torque system. The lower platform depends from the upper platform and is rotated relative thereto at a uniform angular rate.

PATENTED OCT 12 1971 3,612,160

INVENTOR.
William W. Burroughs, Jr.
BY
Thomas N. Young
ATTORNEY

INVENTOR.
William W. Burroughs, Jr.
BY
Thomas N. Young
ATTORNEY

INVENTOR
William W. Burroughs, Jr.
BY
Thomas N. Young
ATTORNEY

INERTIAL REFERENCE APPARATUS

INTRODUCTION

This invention relates to inertial reference units of the type used for vehicular navigation and more particularly to the design of a compound rotatable platform and gimbal structure for such units.

An inertial reference unit, as used herein, comprises a platform structure on which inertial sensors such as gyros and accelerometers are mounted, together with apparatus for placing the platform structure on a vehicle such as an aircraft. This mounting apparatus includes gimbals adapted to receive the platform structure and to permit various degrees of angular freedom between the platform structure and the aircraft whereby the sensors may be isolated from angular motions of the aircraft.

In accordance with the present invention, the platform structure is compound in nature, being divided into first and second mounting platforms. Of these, the first platform carries a gyro adapted to sense rotations of the platform about an azimuth axis which corresponds to a longitudinal axis of the platform structure. The sec nd platform carries a pair of gyros adapted to sense rotations of the platform about respective axes which may perpendicularly intersect the azimuth axis and a pair of accelerometers for sensing accelerations along respective axes corresponding to or bearing a known relation to the gyro axes.

In a preferred embodiment of the invention the first and second mounting platforms are disposed in stacked relation within a cylindrical gimbal member and provided with bearing means to permit rotational freedom of each platform with respect to the gimbal member about the longitudinal axis. Further, the second or lower platform is mechanically related to the first or upper platform through bearing means to permit relative rotation between the platforms thereby permitting the unit to function in an instrument error suppressing mode wherein the lower platform is continuously rotated while the upper platform is fixed to provide a stable azimuth reference. This is accomplished by the provision of an annular bulkhead portion in the inner surface of the cylindrical gimbal from which the upper platform is supported for rotation within the gimbal member. Further, the lower platform is rotationally mounted between the gimbal, or structures fixed thereto, and the upper platform such that alignment between the platforms is easily accomplished.

In the preferred embodiment, the upper platform carrying the azimuth gyro is related to the cylindrical gimbal member to permit angular rotation to be controlled by a torque motor. This motor is included in the azimuth stabilization loop which maintains the upper platform fixed in space. This loop includes the azimuth gyro which, of course, detects angular displacement of the upper platform. The lower platform is related to the upper platform through a drive means such as a motor and gear set such that the lower platform may be continuously rotated about the azimuth axis relative to the upper platform. Accordingly, the angular rate of the lower platform is uniform relative to inertial space irrespective of heading changes experienced by the aircraft or other vehicle carrying the invention. The lower platform, being rotatable relative to both the upper platform and cylindrical gimbal, may be viewed as a depending load on the upper platform.

In the preferred embodiment, assembly and selective disassembly of the unit can be simply and easily accomplished. This feature is provided by the stacked relationship of the upper and lower platforms and selective access provided through either end of the gimbal member thereby permitting either platform to be removed independent of the other. Moreover, the gyros may be mounted on the platforms in such a manner as to facilitate removal and replacement with a minimum of disassembly.

The invention further promotes compactness of the unit and a consequent optimization of heat transfer between the various components. This is provided by the generally cylindrical configuration of the upper and lower platforms about the longitudinal axis of the assembly and the close spacing between the platforms and the cylindrical gimbal permitted thereby.

The present invention contemplates a gimbal system having redundant freedom about one of the axes of angular motion. Accordingly, in the preferred embodiment, the cylindrical gimbal member may be of greater length than diameter. The first surrounding gimbal ring may therefore be closely spaced around the cylindrical gimbal member to mechanically limit the degree of rotation between the gimbals without consequent loss of navigational capability. This results from the addition of a further gimbal ring which is mounted to the vehicle so as to provide the aforesaid redundant freedom.

Still further advantages of the invention may be appreciated from the following description of a specific embodiment thereof to be taken with the accompanying drawing of which:

Figure 1:
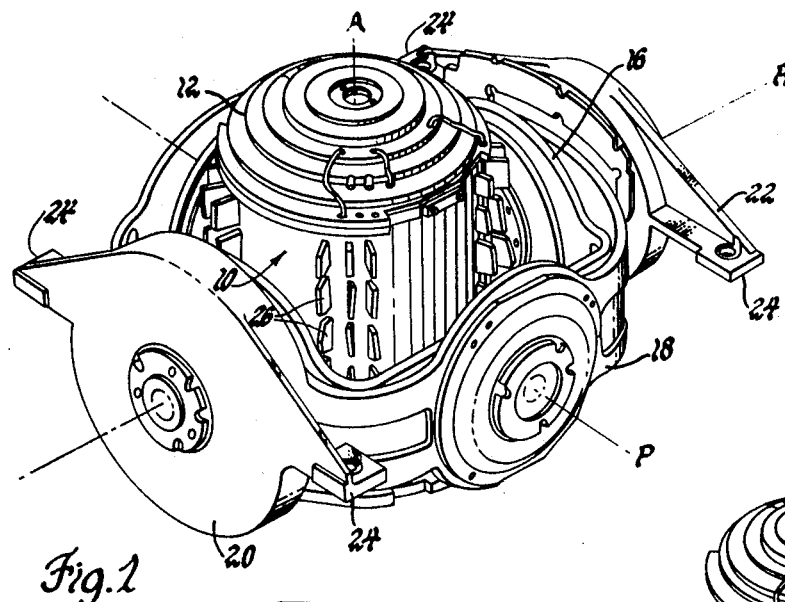
FIG. 1 is an isometric assembly view of an inertial reference unit embodying the invention.

FIG. 1 represents an embodiment of the invention in a four gimbal all-attitude inertial reference unit adapted to be mounted in an aircraft. An inertial reference unit detects and measures accelerations of the aircraft along reference axes which are either fixed in space or fixed with respect to the earth. To permit the measurement instruments to maintain a fixed orientation irrespective of changes in aircraft orientation, a reference structure must be rotatable relative to the aircraft. For purposes of discussion, three axes are define in FIG. 1 as azimuth A, pitch P and roll R axes. Of these axes, only the pitch and roll axes are fixed relative to the aircraft. The azimuth axis corresponds to the aircraft yaw axis only under level flight conditions.

Figure 2:
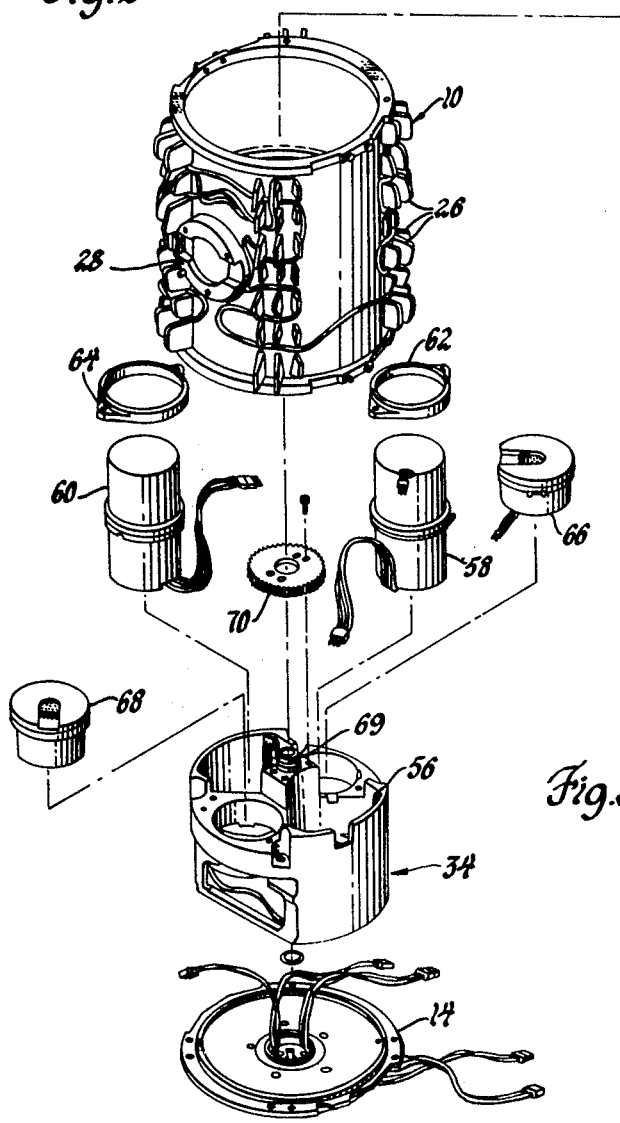
FIG. 2 is an exploded view of the cylindrical gimbal and platform structure of the FIG. 1 embodiment.
Figure 2:
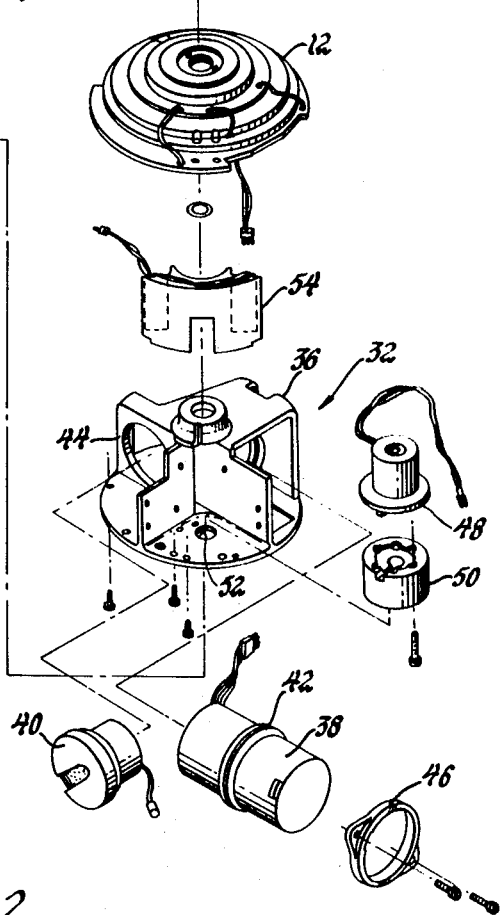

The inertial reference unit comprises a hollow cylindrical inner roll gimbal 10 containing reference platforms and inertial instruments to be described. The inner roll gimbal 10 provides a shield for these instruments against ambient temperature variations and performs a significant function in heat transfer from the platforms as described in subsequent paragraphs of this specification. Mounted on the inner roll gimbal 10 to form a closed container are upper and lower end assemblies 12 and 14, respectively, as best shown in FIG. 2. The assemblies 12 and 14 include stabilization loop apparatus such as torquers and angular displacement transducers to be described.

The inner roll gimbal 10 is mechanically connected to a pitch gimbal 16 which in turn is mechanically connected to an outer roll gimbal 18. The outer roll gimbal 18 is mechanically connected to axially opposite torquer and synchro assemblies 20 and 22, respectively, which together have four azimuth reference surfaces 24 adapted to be affixed to the aircraft by way of a mounting structure not shown. As will be apparent to those skilled in the art, the mechanical connections between the gimbals and the torquer assemblies include bearings to permit relative rotation, torquers to permit control of this rotation in response to gyro signals, and signal transmission means such as slip rings to provide a signal path between the inertial instruments within the inner roll gimbal 10 and a receiving device such as a computer which is external to the inertial reference unit. Rotational freedom about the pitch P and roll R axes is apparent in the drawing with a redundancy about the roll axis. The third degree of freedom is provided by relative rotation between the platforms within the inner roll gimbal 10 and the inner roll gimbal itself as will be described in the following paragraphs.

Figure 3:
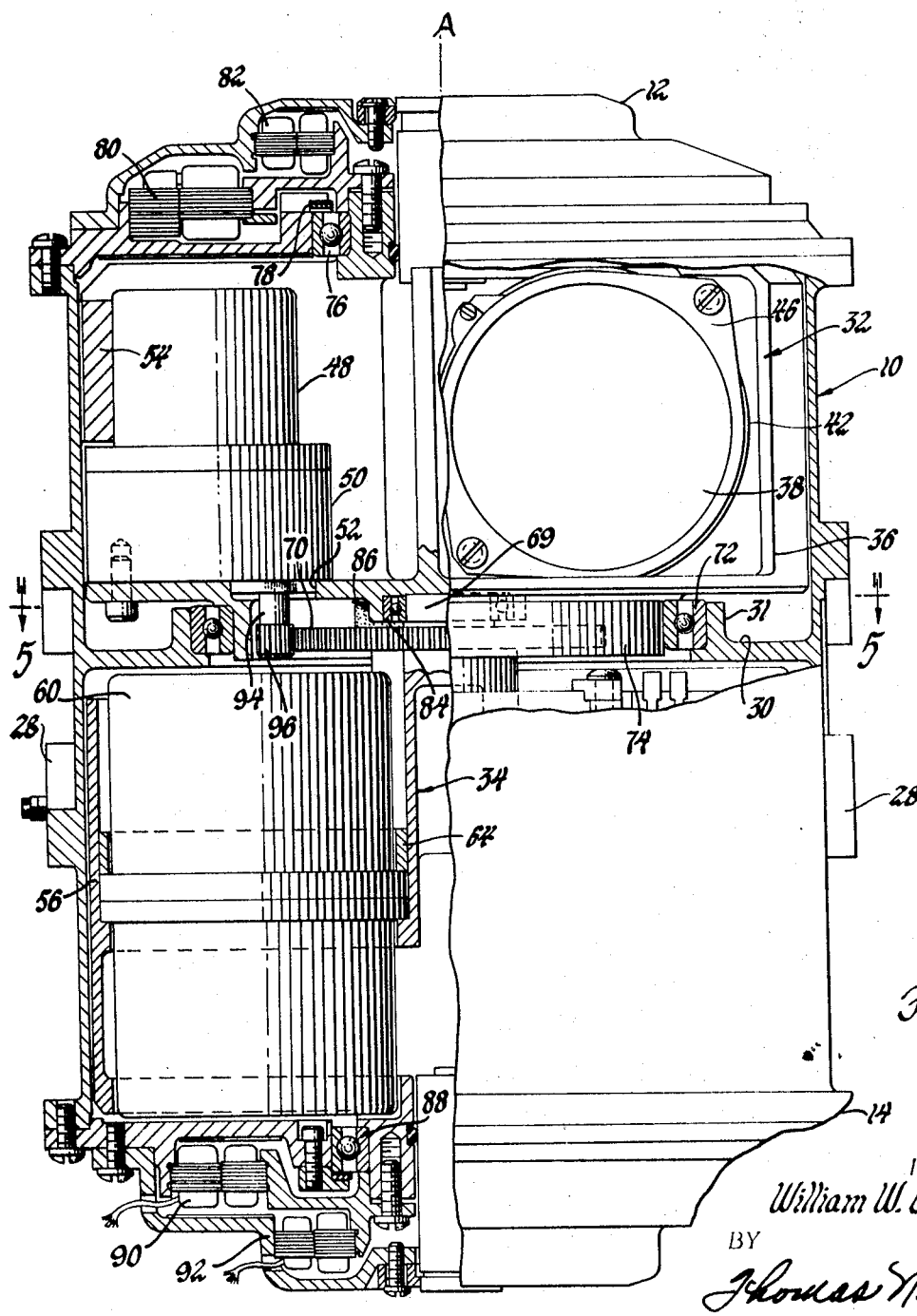
FIG. 3 is partly sectional side view of a gimbal and platform structure incorporating the invention.

As shown in FIGS. 2 and 3 the inner roll gimbal 10 is a hollow cylindrical casting of greater axial than diametrical dimension having a plurality of cooling fins 26 formed on the outer cylindrical surface thereof. Gimbal 10 is provided with a pair of diametrically opposite trunnions 28 which provide the means for mechanical connection to the pitch gimbal 16 shown in FIG. 1. Formed on the inner cylindrical surface of gimbal 10 at an approximately central axial position is an annular and radially inwardly extending bulkhead 30 having an axially extending flange 31. Bulkhead 30 defines an upper interior portion in which an azimuth platform 32 is disposed and a lower interior portion in which a horizontal platform 34 is disposed.

Looking to FIG. 2, the azimuth platform 32 comprises a rigid mounting frame 36 having a cylindrical base and a plurality of vertically extending ribs adapted to receive an azimuth gyro 38 and an azimuth accelerometer 40. The instruments 38 and 40 are single axis devices responding to inertial inputs referenced to the azimuth axis A defined in FIG. 1. The azimuth axis A is, of course, also the longitudinal axis of the assembly shown in FIG. 2.

The gyro 38 is shown in a cylindrical case having an annular collar 42 which abuts one of the ribs in the mounting frame 36. A clamp ring 46 secures gyro 38 to frame 36 in a reference position. Accelerometer 40 is mounted within an opening in rib 44 and suitably secured to a reference position. The azimuth platform 32 also carries a torque motor assembly 48–50, an output shaft of which extends through an axial hole 52 as best shown in FIG. 3. To complete the azimuth platform a plurality of semicylindrical inserts 54 may be secured thereto to provide a generally cylindrical external contour which corresponds to and is closely spaced adjacent the inner cylindrical surface of gimbal 10. As best shown in FIG. 3 the close proximity of the cylindrical contour of the azimuth platform 32 with the inner surface of gimbal 10 provides optimum heat transfer between the elements.

The horizontal platform 34, which fits upwardly into the inner roll gimbal 10 and connects to the azimuth platform 32 in a manner to be described, comprises a generally cylindrical frame member 56 having suitable apertures therein to receive two sets of inertial instruments. These sets of inertial instruments comprise single axis gyros 58 and 60 which fit into axially extending wells in the frame member 56. Gyros 58 and 60 may be maintained in reference positions by means of clamp rings 62 and 64, respectively, thereby to detect angular displacements of the platform 34 about respective axes which are mutually perpendicular to the azimuth axis A. These measurement axes are related to inertial space or a navigation reference such as the earth's surface and do not ordinarily correspond to the aircraft axes P and R described in FIG. 1. The instruments fitted into frame member 56 also include single axis accelerometers 66 and 68 which also fit into suitable receptacles in the frame. Finally, a spur gear 70 is mounted by means of screws or other suitable fasteners over an axially extending annular collar 69 which projects upwardly from the frame 56 as shown in the drawing.

Looking to FIG. 3, the azimuth platform 32 is disposed within the inner roll gimbal 10 in an axially fixed position but is rotatable relative to the gimbal 10. This is accomplished by means of a comparatively large diameter ball bearing 72 which is affixed between the axis flange 31 of bulkhead 30 and an axially extending annular collar 74 on the frame 36. It is noted that the flange 31 is spaced radially inwardly from the end of bulkhead 30 to provide a step to receive bearing 72. In similar fashion the uppermost portion of the azimuth platform 32 is maintained by a smaller ball bearing 76 which is disposed between the frame 36 and the upper end assembly 12. The installation of the azimuth platform 32 is completed by rigidly fastening the upper end assembly 12 to the inner roll gimbal 10 to effectively clamp the frame member 36 in an axially fixed position. The ball bearings 72 and 76 may be axially loaded and clamped in position by means of wavy spring washers 78.

As shown in FIG. 3, the upper end assembly 12 comprises the stator portions of an azimuth platform torquer 80. The rotor portion of torquer 80 is disposed on the azimuth platform 32. Torquer 80 permits the azimuth platform 32 to be angularly displaced relative to the inner roll gimbal 10 about azimuth axis A which corresponds to the longitudinal axis of the assembly shown in FIG. 3. Upper end assembly 12 further includes a synchro transmitter 82 which provides information concerning the angular position of the azimuth platform 32 about the azimuth axis A. Again, the stator portions of the synchro transmitter 82 are disposed on the upper end assembly 12 and the rotor portion is carried by the azimuth platform 32.

In accordance with the above description the azimuth platform 32 is shown to be disposed within the roll gimbal 10 so as to be free to rotate about the azimuth axis A under the influence of the azimuth axis torquer 80. Although the electrical connections are not shown in detail in the figures, it is to be understood that a stabilization loop is connected between the angular displacement detecting gyro 38 and the azimuth torquer 80 whereby the azimuth platform 32 may be fixed to provide a stable azimuth reference regardless of heading changes of the aircraft upon which the system is mounted.

Referring again to FIG. 3, the horizontal platform 34 is shown disposed within the lower interior portion of inner roll gimbal 10 in such a fashion as to be rotatable about the azimuth axis A with respect to the gimbal 10 as well as with respect to the upper azimuth platform 32. This is accomplished by means of an interplatform bearing 84 which is affixed between an annular collar 86 which extends axially from the frame 36 and the axially extending collar 69 which is a part of the horizontal platform frame 56 as best shown in FIG. 2. Bearing 84 thus maintains the upper portion of the horizontal platform 34 in a fixed radial and axial position relative to the azimuth platform 32 and permits relative rotation with respect thereto about the azimuth axis A. A second bearing 88 is disposed between the frame 56 and the lower end assembly 14 to complete the axial and radial restrain and rotational system between the horizontal platform and the inner roll gimbal 10. Again, the bearings 84 and 88 are axially clamped into position when the lower end assembly 14 is fixed to the inner roll gimbal 10.

The lower end assembly 14 includes a coordinate resolver 90 having a stator portion affixed to the end assembly 14 and a rotor portion affixed to the horizontal platform 34. The function of resolver 90 is to resolve the signals from the horizontal gyros 58 and 60 which are disposed on the platform 34. The lower end assembly also includes a platform resolver 92 having a stator portion affixed to the end assembly 14 and a rotor potion affixed to the horizontal platform 34. The function of resolver 92 is to compensate for the continuous rotation of horizontal platform 34 about the azimuth axis A during navigation. The need for this function will be more clearly evident from the following description of the torquer drive between the platforms 32 and 34.

As previously described the azimuth platform 32 carries a torque motor assembly 48–50 having an output shaft 94 which extends axially through the frame 36 toward the horizontal platform 34. Mounted on the end of the shaft 94 is a pinion 96 which meshes with the spur gear 70 mounted on the horizontal platform 34. In FIG. 3, reference character 48 may designate a frequency stabilized power supply and 50 may designate the torque motor per se. The assembly acts to provide a precisely uniform rotational output by way of shaft 94. This output rotates the horizontal platform 34 relative to the azimuth platform 32 at a precisely uniform angular rate which is substantially above earth rate. To prevent the torque motor connection between the two platforms 32 and 34 from rotating the azimuth platform 32 about the azimuth axis A, the azimuth stabilization loop previously described is in constant operation during the navigation mode. The azimuth gyro 38 senses incipient rotation of the azimuth platform 32 and acts to energize torquer 80 to maintain platform 32 in a stable azimuth position. Accordingly, platform 34 is rotated at an angular rate which is uniform with respect to an azimuth stabilized element consisting of upper platform 32. The uniformity of rotation of platform 34 is measured thus with respect to the upper platform 32 and not the inner roll gimbal 10.

Figure 4:
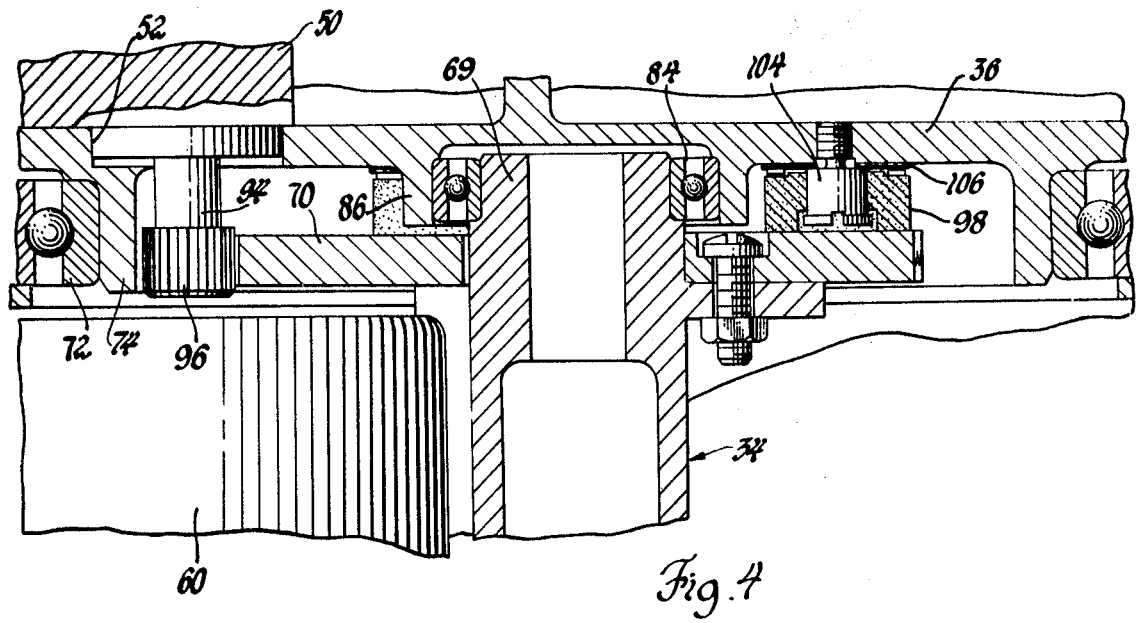
FIG. 4 is a cross-sectional view of a portion of the FIG. 3 structure.
Figure 5:
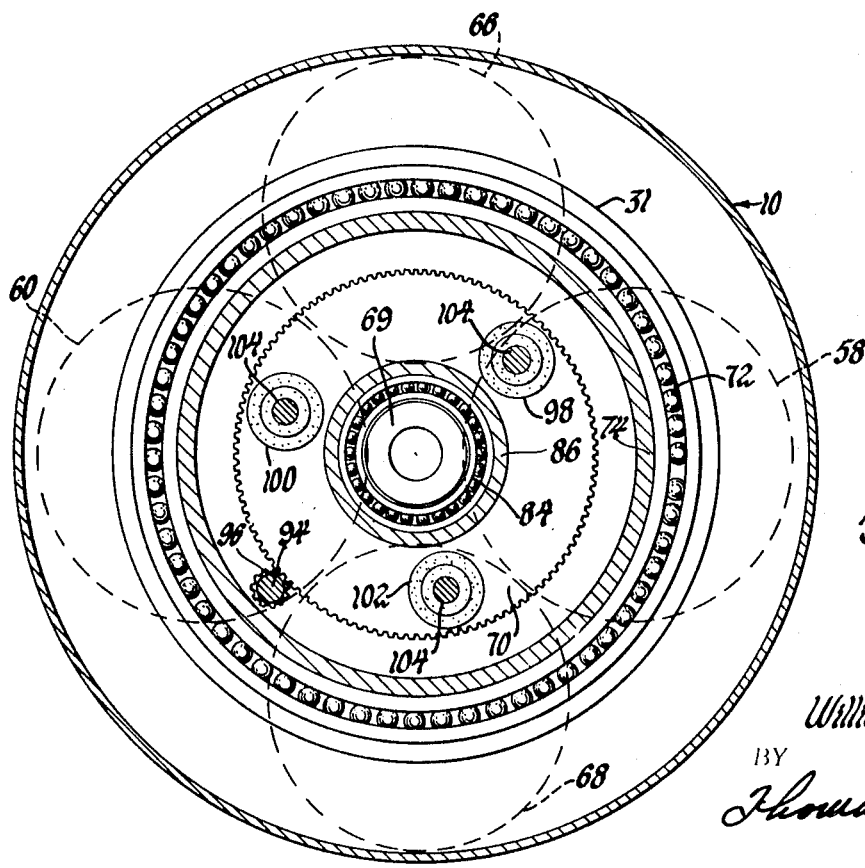
FIG. 5 is a sectional view of the FIG. 1 embodiment.

It is, of course, important for navigational accuracy that the mechanical connection between platforms 32 and 34 be free of rotational irregularities and play. To compensate for meshing irregularities or nonuniformities between pinion 96 and spur gear 70 a frictional drag between platform 32 and spur gear 70 is imposed by means of the apparatus shown in FIGS. 4 and 5. This apparatus includes three cylindrical buttons 98, 100 and 102 which are secured to frame 36 and bear directly upon the upper surface of spur gear 70 as shown in the figure. Buttons 98, 100 and 102 are uniformally spaced about spur gear 70 as shown in FIG. 5. Button 98 will be taken as a representative.

Button 98 is made up of a material such as Graphitar. The button is bored out axially and countersunk to receive a screw 104, the head of which is recessed beneath the surface of button 98 which engages spur gear 70. Spring washers 106 may be disposed between button 98 and the adjacent surface of frame 36 to adjust the relative loads applied to spur gear 70 by the buttons. With the buttons 98, 100 and 102 disposed as shown in FIGS. 4 and 5, backlash between the pinion 96 and the spur gear 70 is prevented.

Summarizing the foregoing specification, an inertial reference unit includes a compound platform system comprising an azimuth platform 32 and a horizontal platform 34 are disposed in stacked relation within a hollow cylindrical gimbal 10. The azimuth platform 32 is rotatable about an azimuth axis A relative to gimbal 10 and is provided with a stabilization loop comprising an azimuth gyro 38 and an azimuth torquer 80. Platform 32 may be thereby stabilized about the azimuth axis A irrespective of rotation of gimbal 10 due to changes in aircraft heading. The horizontal platforms 34 disposed within the gimbal 10 is provided with bearings 84 and 88 to permit rotation relative to both the gimbal 10 and the azimuth platform 32. The rotational drive system 48, 50, 96, and 70 links the azimuth platform 32 to the horizontal platform 34 in a manner which permits the horizontal platform 34 to be rotated relative to the azimuth platform 32 at a uniform angular rate. The lower platform 34 may thus be viewed as a depending rotational load upon the upper platform 32.

Either platform 32 or 34 may be independently removed from the gimbal assembly for servicing simply by removal of the corresponding end assembly 12 or 14. This of course may be accomplished simply by removing a number of screws or other suitable fasteners which hold the end assemblies 12 and 14 to the gimbal 10. Moreover, the instruments carried by the platforms may be simply and expeditiously removed from the platforms for servicing or replacement. Considering particularly the horizontal platform 4 it is apparent that gyros 58 and 60 may be removed from the frame 56 by first removing the spur gear 70 and then loosening the clamping rings 62 and 64.

In addition, the generally cylindrical configuration of the platforms 32 and 34 provides close spacing of relatively large heat transfer areas of both the platforms and the gimbal 10. Accordingly, heat generated by the apparatus carried within the inner roll gimbal 10 may be readily conducted across the small gap between the platforms and the gimbal for removal by way of the exterior gimbal surface and the cooling fins 26. Finally, the inertial measurement unit described in this specification is compact and requires little space aboard the user vehicle.

It is to be understood that various modifications to the illustrated apparatus may be apparent to those skilled in the art and the foregoing specification is to be illustrative rather than limiting in nature.

What is claimed is:

1. In an inertial measurement unit, a gimbal comprising a hollow cylindrical member the length of which is greater than the diameter, the member having an annular bulkhead portion on the inner surface thereof between the longitudinal extremities to define upper and lower interior portions, first and second end assemblies removably secured to respective ends of the cylindrical member, an upper mounting platform of generally cylindrical configuration coaxially disposed within the upper interior portion and radially spaced from the surface of the member, first bearing means between the upper platform and the bulkhead portion and second bearing means between the upper platform and the first end assembly to permit relative rotation between the platform and the member about the longitudinal axis of the member, a first gyro disposed on the upper mounting platform for sensing rotations thereof about the longitudinal axis, a lower mounting platform of generally cylindrical configuration coaxially disposed within the lower interior portion and radially spaced from the surface of the member, third bearing means between the lower platform and the adjacent end assembly to permit relative rotation of the lower platform about the longitudinal axis, second and third gyros disposed on the lower platform for sensing rotations of the platform about respective axes displaced from the longitudinal axis, fourth bearing means between the upper and lower platforms for radially constraining the lower platform but permitting relative rotation between the platforms, and drive means operatively connected between the upper and lower platforms including a motor mounted on the upper platform and having a rotatable output shaft extending toward the lower platform along the longitudinal axis, a pinion mounted on the shaft and a spur gear mounted on the lower platform and engaging the pinion whereby operation of the motor rotates the platforms relative to one another.

2. Apparatus as defined in claim 1 wherein the lower mounting platform comprises a generally cylindrical frame having first and second openings extending into the frame along the longitudinal axis, the second and third gyros being removably secured within the openings for withdrawal along the longitudinal axis.

3. Apparatus as defined in claim 2 further including a second gimbal disposed about the member and connected thereto for allowing limited angular displacement between the gimbal and the member about a first axis perpendicular to the longitudinal axis, a third gimbal disposed about the second gimbal and connected thereto for allowing unlimited angular displacement therebetween about a second axis perpendicular to both the longitudinal and first axes, and means for mounting the third gimbal to a reference surface and allowing unlimited angular displacement of the third gimbal about the first axis.

4. Apparatus as defined in claim 1 wherein the radial spacing between the upper and lower platforms and the inner surface of the member is minimal thereby to optimize heat transfer across the radially extending cooling fins on the outer cylindrical surface of the member.

5. In an inertial reference unit, a hollow cylindrical gimbal having a longitudinal axis defining an azimuth reference, a first platform member disposed within the gimbal for relative rotation with respect to the gimbal about the azimuth axis, gyro means for detecting angular displacement of the first platform member about the azimuth axis, first torquer means connected to the gyro means for rotating the first platform to maintain the first platform in an azimuth reference position, a second platform member within the gimbal depending from the first platform and rotatable relative to both the gimbal and the first platform, and second torquer means connecting the first and second platforms for continuously rotating the second platform relative to the first platform at a uniform angular rate substantially above earth rate.

6. Apparatus as defined in claim 1 further comprising a plurality of frictional drag means carried by said upper platform and uniformly spaced about and in contact with said spur gear to compensate for meshing irregularities and nonuniformities between said pinion and said spur gear.